United States Patent
Isenmann et al.

(10) Patent No.: US 7,962,100 B2
(45) Date of Patent: Jun. 14, 2011

(54) DATA TRANSMISSION SYSTEM FOR WIRELESS COMMUNICATION

(75) Inventors: Andreas Isenmann, Haslach (DE); Fridolin Faist, Oberwolfach (DE); Ralf Schaetzle, Fischerbach (DE)

(73) Assignee: Vega Grieshaber KG, Wolfach (DE)

( * ) Notice: Subject to any disclaimer, the term of this patent is extended or adjusted under 35 U.S.C. 154(b) by 1367 days.

(21) Appl. No.: 11/361,482

(22) Filed: Feb. 24, 2006

(65) Prior Publication Data

US 2006/0192671 A1 Aug. 31, 2006

Related U.S. Application Data

(60) Provisional application No. 60/656,463, filed on Feb. 24, 2005.

(30) Foreign Application Priority Data

Feb. 24, 2005 (DE) .......................... 10 2005 008 488

(51) Int. Cl.
*H04B 17/00* (2006.01)
(52) U.S. Cl. ................... 455/67.11; 455/67.12; 455/39; 370/338; 370/328; 370/465; 370/467; 340/540; 340/531; 340/505; 340/870.02; 340/870.06
(58) Field of Classification Search ............ 455/67.11; 370/338, 328, 466, 467; 340/540, 531, 505, 340/870.02, 870.06
See application file for complete search history.

(56) References Cited

U.S. PATENT DOCUMENTS

| | | | |
|---|---|---|---|
| 6,891,849 B1 | 5/2005 | Jasperneite et al. | |
| 7,010,294 B1 * | 3/2006 | Pyotsia et al. | 455/420 |
| 7,065,391 B2 * | 6/2006 | Kanayama et al. | 455/574 |
| 7,262,693 B2 * | 8/2007 | Karschnia et al. | 340/508 |
| 2003/0236579 A1 * | 12/2003 | Hauhia et al. | 700/79 |
| 2004/0011716 A1 * | 1/2004 | Sandt et al. | 210/143 |
| 2005/0222780 A1 | 10/2005 | Gunzert et al. | |
| 2006/0092039 A1 * | 5/2006 | Saito et al. | 340/825.37 |
| 2006/0140209 A1 * | 6/2006 | Cassiolato et al. | 370/466 |

FOREIGN PATENT DOCUMENTS

| | | |
|---|---|---|
| DE | 19851245 | 12/1999 |
| DE | 10161735 | 6/2003 |
| DE | 10216331 | 10/2003 |
| DE | 202004000928 | 9/2004 |
| EP | 1211582 | 6/2002 |
| RU | 96 119 933 | 1/1999 |
| WO | 03/023536 | 3/2003 |
| WO | WO 03/023536 * | 3/2003 |

OTHER PUBLICATIONS

Cavalieri et al., "On the integration of Fieldbus traffic within IEEE 802.11 Wireless LAN", IEEE International Workshop on Factory Communication System, Oct. 1-3, 1997 pp. 131-138.

* cited by examiner

*Primary Examiner* — Ajit Patel
*Assistant Examiner* — Khai M Nguyen
(74) *Attorney, Agent, or Firm* — Fay Kaplun & Marcin, LLP

(57) ABSTRACT

This invention relates to a data transmission system for wireless communication of a control device with a field unit via a radio transmission device. The communication between control device and radio transmission device takes place via a field bus protocol. Likewise, the communication of the field unit with the radio transmission device takes place via a field bus protocol. The radio transmission device is capable of transmitting the field bus protocol by a radio protocol.

29 Claims, 5 Drawing Sheets

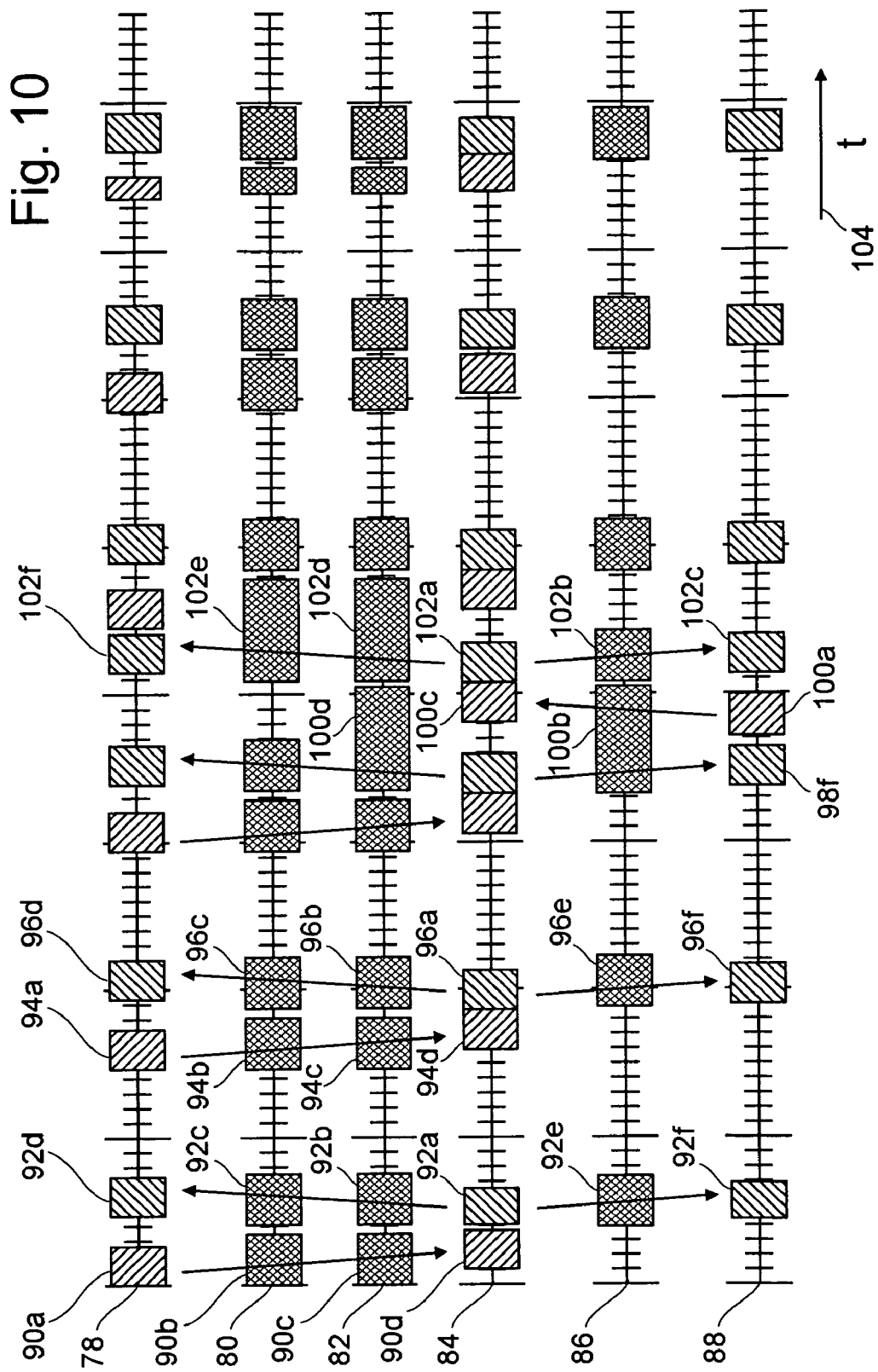

DATA TRANSMISSION SYSTEM FOR WIRELESS COMMUNICATION

PRIORITY CLAIM

This application claims the benefit of the filing date of German Patent Application No. 10 2005 008 488.5-31 filed Feb. 24, 2005 and of U.S. Provisional Patent Application No. 60/656,463 filed Feb. 24, 2005, the disclosure of which is hereby incorporated herein by reference.

FIELD OF THE INVENTION

This invention relates to a data transmission system. In particular, this invention relates to a data transmission system for wireless communication, a control device for wireless communication with a field unit, a transmitting-receiving device and a method for wireless communication in a data transmission system.

BACKGROUND

A bus system shares a common medium for connecting several units to each other. As all units are linked to one bus, communication of each terminal with each other one can be enabled at one bus system, without each unit having to be connected to each other individually. E.g. to be able to connect each one of N terminals to each other, with a star cabling layout $(N-1) \times N \times \frac{1}{2}$ connections, in particular cables, are required.

With the number of units to be connected, the number of connections, for instance cables, increases exponentially. A bus system can replace this great number of connections with a single bus to which all units are connected.

In the field of measuring and control techniques, as well as process treating systems, where sensors or actuators are linked to a controller or an analytical system, nowadays digitally communicating units are used increasingly. Herein, for intercommunication of such units, field buses, such as HART®, Profibus or Fieldbus Foundation, are implemented.

Herein, wiring of the units involved may turn out to be difficult, e.g. when obstacles, such as the course of a river or the like, have to be passed. Also, existing wiring is rather difficult to modify, and a required extension can be problematic. For complex geographical structures or widely separated measuring units wiring can eventually be complicated and expensive. Furthermore, wiring is not very flexible in case of modifications.

An Ethernet system (a very popular protocol for a LAN) is a bus system to which several parties can be connected. I.e. the units use a common medium. Special protocols of the IEEE 802.X family regulate access to the bus. With the IEEE 802.11 protocol family, as the so-called WLAN, the air was introduced as the common medium instead of a bus. All units located in the radio range of a transmitter equally receive the signals of the transmitter as if they were connected to the same bus. Thereby, wireless communication is possible in the so-called infrastructure mode or in ad hoc mode.

For wired communication by these protocols, control units or measurement evaluation units, and remote sensors or field units can communicate with each other. Sensors or field units then supply the measured values, which are evaluated by the control units. Circuitry required for wired communication is complicated and expensive and furthermore not flexible.

The international patent document WO 03/023 536 A1 provides a radio module for a field unit, which allows field units not having an integrated radio device to be operated easily and cost-effectively by radio.

Radio transmission technologies, such as WLAN or Bluetooth, make use of the so-called ISM (Industrial, Scientific and Medical Band) band for data transmission. The ISM band can be used license-free for industrial, scientific or medical applications. The 2.4 GHz-band has been released globally for industrial, scientific or medical applications. However, this band can also be used e.g. by cordless telephones or baby phones. Although conditions regarding transmitting power and interference with adjacent frequency ranges have to be met, within the free ISM band, transmission interferences of the many units operating in this band may occur. Such interferences may possibly require transmitted information to be repeated. Thus, delays can occur at the time of transmission.

SUMMARY OF THE INVENTION

According to an exemplary embodiment of the present invention, a data transmission system for wireless communication, a control device for wireless communication with a field unit, a transmitting-receiving device, and a method for wireless communication in a data transmission system are provided.

According to an exemplary embodiment of the present invention, a data transmission system for wireless communication, comprising a control device, a field unit and a radio transmission device is provided. The control device is adapted to communicate with the radio transmission device over a field bus protocol, the field unit being adapted to communicate with the radio transmission device via the field bus protocol. The radio transmission device is configured to transmit the field bus protocol by a radio protocol.

According to another exemplary embodiment of the present invention, a simple data transmission system for wireless communication may be provided.

According to another exemplary embodiment of the present invention, a control device for wireless communication with a field unit, comprising a field bus conversion device and a timeout adaptation device is provided. The field bus conversion device is adapted to convert a control signal into a field bus signal, wherein the timeout adaptation device is configured to adjust a timing behavior of the field bus conversion device.

According to another exemplary embodiment of the present invention, a transmitting-receiving device is provided, which comprises a transmitting device and a receiving device. The transmitting device is adapted to convert a field bus protocol into a radio protocol and transmit it, and the receiving device is configured to convert the radio protocol into the field bus protocol and receive it.

According to another further exemplary embodiment of the present invention, a method for wireless communication in a data transmission system is provided. The data transmission system comprises a control device, a field unit and a radio transmission device. Therein, the method comprises the steps of: making the control device communicate with the radio transmission device by a field bus protocol, transmitting the field bus protocol by a radio protocol, and making the radio transmission device communicate with the field unit by the field bus protocol.

Nowadays, in measuring, controlling and regulating techniques, a field bus protocol may be used for transmitting measuring, controlling or regulating data. By a field bus protocol, a control device and a field unit can communicate with each other over a bus. E.g. a control device, which may serve for displaying measuring data and evaluating measuring data, can request a field unit to provide a measured value. The field unit may comprise a sensor, which e.g. detects measured values and can send them to the control device by a field bus protocol. However, a field unit can also be an actuator of a control or regulating device, which may be driven as specified by the control device.

A field bus protocol may comprise several commands, which are standardized. By invoking one of the commands, a signal sequence corresponding to the protocol may be output on the connected bus, in particular a field bus. This field bus signal sequence may be received and evaluated by the actuated unit. This actuated unit may take predefined actions by itself, and e.g. feedback measured values to the controller over the bus.

A bus, in particular a bus system, may be a physical connection or a cable. E.g. a bus may be a shielded twisted pair cable. Any number of units may be connected to a bus in order to exchange data with each other. By addressing, an individual unit may be addressed directly.

By using a radio transmission device it may be possible that a control device may communicate with the radio transmission device via the common field bus protocol. For the control device, the radio transmission device may appear transparent. In other words, this means that for the control device, a field unit or another bus compliant unit may appear as if a standard compliant bus, in particular a standard compliant cable, were connected.

According to another exemplary embodiment of the invention, a data transmission system for wireless communication in the field of measuring and regulating techniques is provided. The use of wireless communication may simplify the connection of measuring units among each other.

The radio transmission device may receive signals corresponding to the field bus protocol from the control device. The radio transmission device may convert these signals into corresponding signals of a radio protocol. This conversion may take place at any layer, for instance of an OSI communication protocol. E.g. physical field bus signals may be converted into physical radio transmission signals. Therefore, the radio transmission device may correspond to a gateway in a communication network.

The field unit may also be coupled with the radio transmission device over a field bus. Over this field bus, the field unit may talk to the radio transmission device via the field bus protocol. The radio transmission device may be adapted to convert signals of the radio protocol into signals of the field bus protocol. In other words, a connection between a control unit and a field unit over a field bus may be physically interrupted by a radio transmission device, and thus the range thereof may be extended. A great distance may be spanned therewith without requiring a modification of cabling or the bus.

The radio transmission device may talk both to the control unit and the field unit via the field bus protocol. The radio transmission device may be coupled both with the field unit and the control unit over a field bus. For the communication between control unit and field unit, the radio transmission device may appear transparent. Communication may also take place from the control unit via the radio transmission device to the field unit. Equally, communication may take place from the field unit via the radio transmission device to the control device.

Two-way bidirectional communication may be possible by the radio transmission device. E.g. the control device may transmit a request signal according to a field bus protocol to the field unit. Following this request signal, the field unit with a defined or determined measured value may provide the control unit with a response signal via the field bus protocol. Thus, e.g. the field unit, which may be any measuring sensor, may be requested to take a measurement and to provide the control unit with the determined measured value.

Based on the transparency of the radio transmission device towards a field bus protocol, standard units may be used. This means units, which may be used for communication of a standardized field bus protocol, may talk together via the radio transmission device.

E.g. a range of a field bus system may be extended by use of repeaters. This means that for instance radio transmission devices may have amplification elements, which may serve as relay stations and thus may extend the range of the bus. With the use of radio technology obstacles, such as for instance the course of a river, may be overcome. Thereby, field units may also be put to use at geographically inconvenient locations.

By radio technology, it may also be possible to use field units in mobile operating scenarios. The stationary nature of a field unit, for instance a measuring sensor, may be offset by the use of a radio transmission device. Therefore, e.g. measurements may also be taken on mobile objects, such as for instance vehicles.

According to a further exemplary embodiment of this invention, a data transmission system is provided, wherein the field bus protocol can be a protocol selected from the group of the field bus protocols HART®, Profibus and Fieldbus Foundation. By using the specific field bus protocols HART®, Profibus or Fieldbus Foundation, it may be possible to use the data transmission system in relation with today common control or field units. If one of the standards may be implemented in the radio transmission device, then the radio transmission device may be transparent for the corresponding field bus protocol HART®, Profibus or Fieldbus Foundation.

When the protocol conversion of the corresponding field bus protocol into the corresponding radio protocol may be implemented in the radio transmission device, measuring units or control units of the corresponding standard may easily be connected by a radio transmission device. A physical closed bus may thus be omitted. A closed bus in this content may mean that a continuous physical connection between individual units exists at the bus through a corresponding bus cable.

According to a further exemplary embodiment of the present invention, a data transmission system is provided, wherein a timeout behavior of the HART® protocol in the control device is adapted to the radio signal transmission. According to the HART® specification, a master or a control device may request a field unit or slave in order to be provided with measured values. Following the request of a master, according to the HART® specification, a response of a slave should be available within 256 ms.

However, due to protocol conversion measures in the radio transmission device, longer signal propagation times may result. In other words, this means that in the radio transmission device, a HART® protocol may have to be converted into a radio protocol. E.g. it may happen that overhead information, such as checksums or frame information, has to be added in order to generate a radio protocol packet. Thereby, an overhead may be generated, which can result in an additional delay for the signal propagation time.

Corresponding delays may occur at signal depacketizing. Depacketizing may be necessary for reconverting radio signals into field bus signals. Both when sending the request and when sending a response signal of a slave to the master, respectively a packetizing and depacketizing operation may be required. Thus, a response signal of a slave to a master request may take more than 256 ms. Additional latency may be taken into account by adapting timeout behavior in the control or evaluation unit in relation to the HART® standard.

An increase of the timeout behavior in relation to the HART® standard may allow a longer range of a radio signal to be obtained. It would thus be possible to take into account that for radio transmission several repeater stations can be used. E.g. repeater stations may receive and amplify the radio signal and output it again over a radio link. Thereby, latency may be even longer due to additional packetizing and depacketizing. Furthermore, a corresponding response behavior of a field unit to a request from a master may be extended. By a timer expiring after 256 ms or more than 256 ms this additional timing behavior may be taken into account.

According to a further exemplary embodiment of the present invention, a data transmission system is provided, wherein the radio protocol is a protocol selected from the group of the radio protocols WLAN, Bluetooth and Zigbee. Wireless LAN, Bluetooth and Zigbee may be standardized radio protocols. Consequently, the implementation of these standards for translating a field bus protocol into the corresponding radio protocol may be facilitated as no new development of a radio transmission protocol is required.

However, a proprietary radio protocol may also be used advantageously. A proprietary radio protocol may be a radio protocol, which is at least in part different from a standardized radio protocol. By a proprietary radio protocol, it may be achieved that a range of the radio transmission system with the use of an omnidirectional antenna according to a European standard may be 500 m or according to an American standard 1600 m. Furthermore, some requirements for transmission of a HART® radio packet may be taken into account.

The range of a radio transmission system may also be further increased by the use of specifically shaped antennas, like directional antennas. With the use of a proprietary radio transmission protocol characteristic features when packetizing field bus signals into radio signals may be taken into account. The reason for using a proprietary protocol may be a higher range as allowed by the use of WLAN, Bluetooth or Zigbee.

According to a further exemplary embodiment of the present invention, a data transmission system is provided, wherein the radio transmission device is configured to transmit an analog signal to the control device. Analog signals, like e.g. a 4 . . . 20 mA signal, may be transmitted via the radio transmission device. For this purpose, the analog signal may be digitized and converted into a signal corresponding to the HART® protocol. As the radio transmission device is configured for transmitting a HART® protocol via a radio protocol, it thus may be possible to transmit also analog signals via the radio interface. The analog signal may also be converted into a radio protocol according to some other conversion rule.

According to a further exemplary embodiment of the present invention, a data transmission system is provided, wherein the radio transmission device is configured to transmit a switch signal to the control device. It thus may be possible to connect sensors, for instance switches generating a switch signal, directly to the radio transmission device. Likewise, just as for the use of analog signals, a separate field unit may not be required for interrogating an analog signal or a switch signal. Directly connecting an analog signal or switch signal to the radio transmission device thus may allow for cost savings.

An analog signal may for instance be a filling level signal. This means that a filling level may be assigned, for instance linearly, to a current range from 4 to 20 mA. E.g. an empty filling level may correspond to a signal of 4 mA, and a full filling level to a signal von 20 mA. In between any analog current values corresponding to various filling levels may be provided.

According to a further exemplary embodiment of the present invention, the radio transmission device further comprises a memory device, wherein the memory device is adapted to store information provided by the field unit. The memory device is adapted to provide the stored information to the control device, on demand. Thereby, in the field, communication between radio transmission device and field unit may take place without a measurement having been requested by the control device.

I.e. in the memory device of the radio transmission device, measured values, which may be supplied continuously by the field unit or may be polled regularly by the radio transmission device, can be saved. If a request from a control device to a field unit may occur, then it may not be necessary to pass the request on to the field unit, but the request of the control unit may be answered directly by the radio transmission device with values from the memory.

A radio transmission device may have two sides. A control unit side and a field unit side. The control unit side herein may designate the area of the connection of the field bus of the radio transmission device to the control device whereto the bus may be connected. The field unit side may designate the side of the connection of the field unit to the field bus of the radio transmission device. Between the control unit side and the field unit side of the radio transmission device, radio transmission may take place after corresponding conversions. The memory device may be arranged both at the control device side of the radio transmission device and the field unit side of the radio transmission device. In other words, with control unit side storage, measuring information may be provided without airborne transmission of a request signal. With field unit side storage, the request signal may first be transmitted over the air.

According to further exemplary embodiments of the present invention, the control device is adapted as a HART® master and the field unit as a HART® slave. A HART® master may communicate with a HART® slave.

According to a further exemplary embodiment of the present invention, a data transmission system is provided, wherein the field unit is adapted as a sensor from the group comprising a filling level sensor, a pressure sensor, or a limit sensor. It may thus be possible to use wireless communication for measuring filling levels, pressures and/or limits.

According to a further exemplary embodiment, a data transmission system is provided, wherein the control device is configured to make a new request following a response to an own request at the earliest after 75 ms. With a control device waiting for at least 75 ms, access control to the field unit may be made.

The HART® specification may allow for alternate access of two masters to the HART® bus or to one or several slaves through rules defining the master's chronological access to the bus. Following the response to an own request, a master may anew make a request at the earliest after 75 ms. However, following a response to an outside request, a master may make a new request after 20 to 75 ms already. This ensures that both masters can always function alternately.

This means that due to the use of radio technology, a physical bus modeled by the radio technology may depend on the range of radio signals. Several units may be connected to one bus. Within the receiving range of the radio transmission device, several control devices or masters or several field units or slaves may be used. Occasionally, the radio range of a radio transmission device may be defined by a circle e.g.

around the field unit side of the radio transmission device, in particular around an antenna of a part of a field unit side radio transmission device. The radius of this circle may be predefined by the radio signal range. If the control unit side parts of the radio transmission device are located on this circumference, then communication between the corresponding master and slave may take place. In other words, this means that the corresponding master and slave may see each other.

Another master may also be located on the circumference around the field unit side side of the radio transmission device. If the second master or the second control unit side side of the radio transmission device is located on the circle opposite the control unit side of the radio transmission device of the first control unit, then the master's radio signal may reach the slave side side of the radio transmission device, but not that of the second master.

Requests, which may be sent from the masters to the slave, may not be seen mutually by both masters. However, they may see the response signals of the slave to the respective master, as they may be both located within the radio range thereof. The master receiving a response from the slave may recognize by analyzing the response signal whether it is a response to the request it has sent. If it is a request sent by the corresponding master itself, then, if it wants to make a new request, it may have to wait for at least 75 ms. The request may be an own request.

During this waiting period or compulsory pause, another master may be given the opportunity to direct a request to the slave, and to access the bus, in particular the radio transmission link. In order to take into account all possible latencies, which may occur due to the packetizing and depacketizing of the bus signals in radio signals, it may be necessary to wait for an own request for 500 ms or more until a new request of the master may will be sent to the slave. This may ensure that the other master may direct a request to the slave.

According to a further exemplary embodiment of the present invention, a data transmission system is provided, wherein the control device is adapted to make a new request following an outside request within a range of 20 ms to 75 ms. If upon receipt of a response to a request from the other master a request is sent from the master to the slave within a time range of 20 ms to 75 ms, then, based on the timing behavior according to the HART® protocol, it may be ensured that during this time the other master may direct no request to the slave. In the selection of this time window, in relation to the HART® standard, times created by the additional packetizing and depacketizing of the signals in radio signals may have to be taken into account.

According to a further exemplary embodiment of the present invention, a control device for wireless communication with a field unit is provided. The control device comprises a field bus conversion device, a timeout adaptation device, wherein the field bus conversion device is configured to convert a control signal into a field bus signal. Herein, the timeout adaptation device is configured to set a timing behavior of the field bus conversion device.

A field bus conversion device may allow protocol specific commands to be converted into field bus signals. This conversion may take place according to a field bus protocol. The field bus protocol or the field bus conversion device may have a timer, which may serve to monitor the expiry of a certain waiting period. This may be e.g. a register, which may be decremented in a corresponding time unit. By a timeout adaptation device, this timeout or timing behavior may be adapted to modified circumstances. E.g. it may thus be possible to take into account a timing behavior, which may have changed in relation to a standard due to the introduction of radio signal transmission. E.g. longer signal propagation times may be taken into account.

According to further exemplary embodiments of the present invention, the characteristics mentioned for the data transmission system may be applicable to the control device. A HART® bus protocol may be adapted in its timing behavior to modified boundary conditions.

According to a further exemplary embodiment of the present invention, a transmitting-receiving device or transceiver, comprising a transmitting device and a receiving device, is provided. Herein the transmitting device is adapted to convert a field bus protocol into a radio protocol and send radio protocol packets, and the receiving device is adapted to convert the radio protocol into the field bus protocol and receive radio protocol packets.

By transmitting and receiving a field bus or radio signal bidirectional communication via the transmitting-receiving device may be ensured.

Several transmitting-receiving devices may communicate with each other. A field bus may be simulated thereby. Standard field bus units may be connected to a transmitting-receiving device. For standard field bus units, for instance control units or field units, the bus modeled by the transmitting-receiving device may appear as a transparent compatible field bus.

According to a further exemplary embodiment of the present invention, a transmitting-receiving device is provided, wherein the transmitting-receiving device is adapted to transmit an analog signal. Thereby it may be possible to connect for instance a measuring signal transmitter or sensor, which supplies the analog signal, directly to the transmitting-receiving device, and transmit the supplied signal. Thereby it may be possible to convert the signal before the transmission into a field bus signal, i.e. into a signal according to a field bus protocol. The signal thereby may be received and evaluated by a standard field bus master or a standard field bus control unit.

The analog signal may be for instance a 4 . . . 20 mA signal.

According to a further exemplary embodiment of the present invention, a transmitting-receiving device is provided, wherein the transmitting-receiving device is adapted to transmit a switch signal. It may thus be possible to connect a sensor, or for instance a contact switch, such as an alarm switch, directly to the transmitting-receiving device. The switch signal may be converted into a field bus compatible signal and transmitted over the radio transmission link.

According to a further exemplary embodiment of the present invention, a transmitting-receiving device is provided, wherein the transmitting-receiving device has a memory device. The memory device is adapted to store field bus protocol information, and the memory device is then adapted to provide the stored information on demand. The format of the stored data may either comply with a field bus packet or the mere payload data depacketized from the field bus packet may be stored. It thus may be possible to collect information for instance from one or several field units connected to the transmitting-receiving device, and store it in the memory device.

Upon receipt of a request, the transmitting-receiving device may provide information stored in the memory device, for instance a stored measuring signal. Provision may be made for instance via the air interface of the transmitting-receiving device by radio. E.g., it may also be possible to save signals received via the radio interface.

Many embodiments of the invention have been described with reference to the data transmission system for wireless communication. These embodiments are also applicable for the control device, the transmitting-receiving device, and for the method for wireless communication in a data transmission system.

Hereafter, exemplary embodiments of this invention will be described with reference to the figures.

FIG. 10 shows a timing behavior according to a sample embodiment of this invention.

DETAILED DESCRIPTION OF EXEMPLARY EMBODIMENTS

Figure 1:
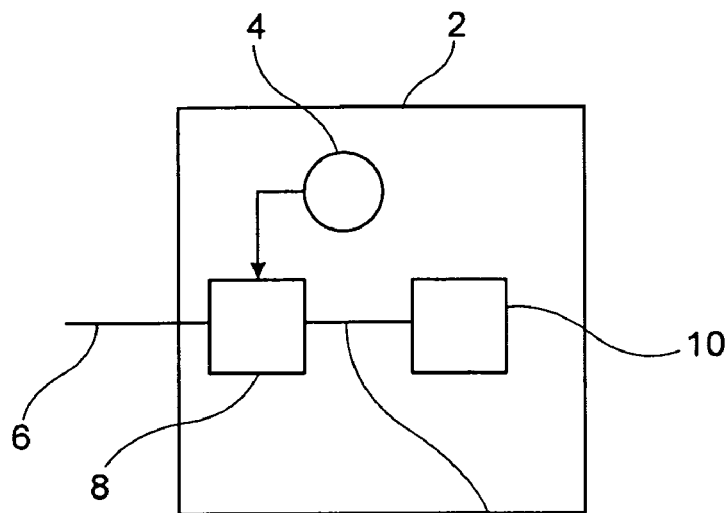
FIG. 1 shows a schematic block diagram of a control device according to an exemplary embodiment of the present invention.

The illustrations in the figures are schematic and not to scale. In the following description of FIG. 1 to FIG. 9 the same reference numerals are used for identical or corresponding items.

FIG. 1 shows a schematic block diagram of a control device according to an exemplary embodiment of the present invention. The control device 2 illustrated in FIG. 1 comprises a field bus conversion device 8 and a timeout adaptation device 4. The control device 2 further comprises the control signal device 10 and the field bus 6 or the field bus interface 6. The control signal device 10 can for instance be connected to an input device, whereby the control device 2 receives commands for detecting measured values.

In the control signal device 10, the input signals or commands, for instance provided via a man-machine interface, are converted into field bus specific commands. These commands correspond to the HART® protocol.

The control signal device 10 is connected to the field bus conversion device 8 via the connection 12. The commands generated by the control signal device 10 are converted in the field bus conversion device 8 into corresponding field bus signals, complying with the field bus or HART® protocol. With the timeout adaptation device 4 it is then possible to adapt a timeout behavior of the HART® protocol. For this purpose, the timeout adaptation device 4 is connected to the field bus conversion device 8. The timeout adaptation device 4 can receive for instance information concerning the correct timeout behavior via a man-machine interface.

The timeout adaptation device 4 has access to a register, wherein protocol specific data of the HART® protocol are saved in the field bus conversion device 8. In the field bus conversion device 8, the HART® protocol is running, which also makes use of the modified timers or register values. Consequently, in the field bus conversion device 8, the corresponding field bus signal or HART® signal for an interrogation request is also output to the field bus 6. The master 2 or the control device 2 can thus address a slave located on the field bus 6. The response signal expected by the master 2 is recognized in the field bus conversion device 8. If it is not available within the period predefined by the timer, the absence is signaled to higher protocol authorities, e.g. in the control signal device 10.

The control device 2 or master 2 receives over the field bus 6 response signals coming from field units. The field bus conversion device 8 receives over the field bus 6 signals corresponding to the HART® protocol, and converts them into HART® commands. The HART® commands are passed on over connection 12 to the control signal device 10 for evaluation. E.g., the control signal device 10 can be a microprocessor controlling the control device 2.

Figure 2:
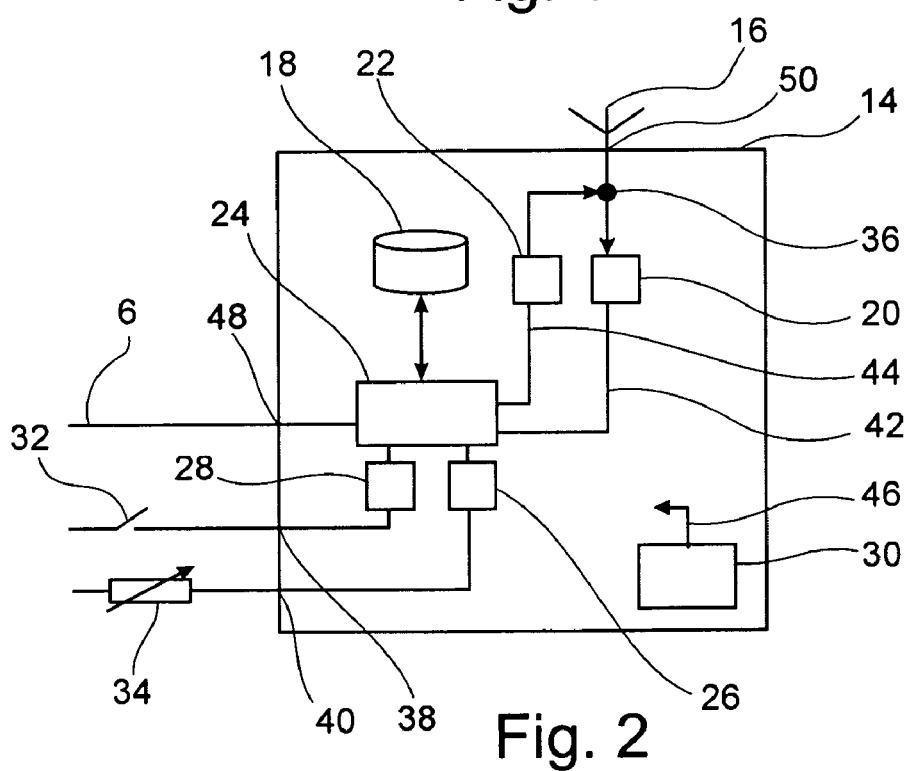
FIG. 2 shows a schematic block diagram of a transmitting-receiving device according to an exemplary embodiment of the present invention.

FIG. 2 shows a schematic block diagram of a transmitting-receiving device according to an exemplary embodiment of the present invention. FIG. 2 shows the schematic construction of a transmitting-receiving device 14 or radio module 14. The radio module 14 has four external ports. The external ports are the analog signal port 40, the switch signal port 38, the field bus signal port or HART® bus signal port 48, and the antenna port 50. By two radio modules 14 a HART® bus can be separated and modeled. To the HART® bus port 48 a standard HART® bus medium 6 is connected, to which a HART® master, an evaluation unit or a control unit, as well as any number of HART® slaves, field units or sensors can be connected.

For a simple description, it will now be assumed that a single HART(& master is connected to the HART® bus 6. Due to the bidirectional transmission on the HART® bus 6, the HART® master can both transmit and receive HART® protocol signals or HART® telegrams. When sending the HART® master outputs a HART® telegrams corresponding to the HART® protocol on the HART® bus 6. The message packet reaches the multiplexing device 24. The multiplexing device 24 retransmits the HART® telegram to be transmitted over the transmission line 44 to the transmitting device 22.

In the transmitting device 22, the HART® telegram is packetized into a radio telegram. Herein, for instance overhead bytes for checksums or other radio relevant arrangements are performed. Also, the HART® telegram is physically adapted to radio transmission. The transmitting device 22 retransmits the thus processed radio telegram to the coupling-decoupling device 36. Therein, the signal is subsequently passed on to the antenna 16 over the antenna port 50. From the antenna 16, the radio signal containing the radio telegram continues to spread over the air interface. In the radio message, the HART® telegram is packetized.

When receiving, the antenna 16, which can be operated both internally and externally, receives a radio telegram. The radio telegram is passed on from the antenna 16 over the antenna port 50 to the coupling-decoupling device 36. In the coupling-decoupling device 36, this is recognized as a received radio signal and consequently passed on to the receiving device 20. In the receiving device 20, the radio telegram is reconverted into the HART® telegram. For reconversion, possibly existing overhead bytes for instance for checksums used for the radio transmission, are removed.

The receiving device 20 depacketizes the HART® telegram contained in the radio packet, and transfers it over the receiving line 42 to the multiplexing device 24. The multiplexing device 24 outputs the received HART® telegram on the HART® bus 6 over the HART® bus port 48. Over the HART® bus 6, the HART® packet corresponding to the HART® protocol reaches the HART® master. The HART® master can thus for instance receive a requested response from a HART® slave or field unit.

Also, as this is a standard HART® bus 6, a HART® slave or field unit can be connected to the HART® bus port 48 or the HART® bus 6. If the antenna 16 receives a radio message, then the radio message is passed on over the antenna port 50 to the coupling-decoupling device 36. Therein, the received radio telegram is recognized as a received radio telegram, and passed on to the receiving device 20.

The receiving device 20 depacketizes the HART® message contained in the radio telegram and retransmits the HART® telegram over the receiving line 42 to the multiplexing device 24. This operation takes place transparently. I.e. the content of the HART® telegram is not interpreted. Only an interpretation of the protocol layers, which are required for translating the HART® protocol into the radio protocol or the radio protocol into the HART® protocol, is taking place.

Measuring data or other information contained in the telegram dedicated for the master or the slave is not evaluated in the transmitting or receiving device 22, 20 and consequently neither in the transmitting-receiving device 14. The received HART® telegram is passed on via the multiplexing device 24 on the HART® bus over the HART® bus or field bus port 48.

The HART® bus 6 corresponds to a standard HART® bus. I.e. a radio module or transmitting-receiving device 14 is transparent for a HART® master or HART® slave. E.g. the received HART® telegram can be a request of a master to a HART® slave. The HART® slave, the field unit or the sensor can evaluate the HART® request according to the HART® protocol and output a response, e.g. a measuring signal, as a HART® telegram on the HART® bus. This response reaches over the standard HART® bus 6 and the HART® bus port 48 the radio module 14, and from there reaches the multiplexing device 24.

The multiplexing device 24 outputs the HART® message on the transmission line 44, over which it reaches the transmitting device 22. In the transmitting device 22, the response signal corresponding to the HART® protocol is converted into a radio telegram and radioed via the coupling-decoupling device 36 and the antenna 16 in the air to a remote radio module.

The antenna 16 can be either a solidly mounted antenna or a removable one. It can be external or internal to the radio module 14. By using a removable or exchangeable antenna 16 the range of the radio signal can be increased, for instance when using special antennas with a particular radiation pattern.

In general, omnidirectional antennas or so-called omni antennas are used, which achieve a spherical propagation of the radio signal. With transmitting powers conventional in Europe in the frequency range of 2.4 GHz, a radio signal range of about 500 m can be achieved thereby. When using another frequency range, e.g. 900 MHz, as for instance allowed in the U.S.A., a range of 1600 m can be achieved with an isotropic radiator. Both values refer to the direct line of sight, i.e. without obstacles in the way. With the use of particular zone or directional antennas, higher ranges can be achieved.

FIG. 2 also shows the switch signal port 38. The latter is provided in order to allow simple switches to be connected directly to the radio module without additional use of a slave. A switch can for instance be an alarm sensor. The switch 32 or the switch signal generated thereby is retransmitted over the switch signal port to the switch signal processor 28. Therein the switch signal is converted into a corresponding HART® bus telegram, and can thus be provided via the multiplexer 24 over the radio link described before to a HART® master for evaluation.

Similarly, an analog signal or an analog signal generator 34 is used. The analog signal can be a 4 . . . 20 mA signal 34. The latter is connected at the analog signal port 40 to the radio module 14. Over this port 40 the analog signal reaches the analog signal converter 26, which digitizes the analog signal and converts it into a corresponding HART® protocol packet. As described above, and similarly to the digital switch signal, the analog signal can be provided over the radio link to a master or control unit for evaluation.

A radio module 14 can have several analog signal ports 40 or switch signal ports 38 and corresponding transformation devices 28 and 26. The memory device 18 is also provided in the radio module 14. The memory device 18 is connected to the multiplexing device 24. The memory device 18 enables the radio module to continuously collect measured values in the background. The measured values are supplied by a field unit connected to the field bus 6, or by the switch signal port 38, or the analog signal port 40.

In case several field units are connected to the HART® bus 6, then the data respectively output by the individual sensors or field units can also be collected. The advantage of the independent collection of measuring signals in the radio module 14 with the memory device 18 is that when another radio module requests a measured value, the radio module 14 can answer the request directly. I.e. the radio module 14 does not have to retransmit a HART® telegram over the HART® port 48 on the HART® bus 6 to the sensor or the field unit, but can return via the multiplexing device 24 to the data storage 18 where the relevant sensor values are stored.

The radio module can thus answer the request directly, without the necessity to output this request on the HART® bus towards a sensor. This improves the response behavior regarding measuring value requests. The request can thus be accelerated, and take place asynchronously, i.e. at random moments.

The microprocessor 30 controls both the conversion of the switch signals and analog signals in the converting devices 26 and 28 and the access or distribution of the information to the memory device 18. Microprocessor 30 controls the transmitting process and receiving process, i.e. it controls the transmitting device 22 and the receiving device 20. The microprocessor 30 also controls the distribution of the information in the multiplexing device 24. For this purpose, the microprocessor 30 is connected to the devices 26, 28, 24, 18, 20, and 22. This connection is indicated by the dashed arrow 46 in FIG. 2.

The interrogation of the sensor or the field unit, or the background interrogation is also controlled by the microprocessor 30. Via the microprocessor 30, it is also possible to set the interrogation frequency or the polling interval.

Figure 3:
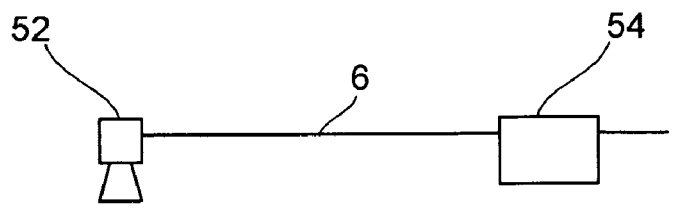
FIG. 3 shows schematically a wired bus arrangement between a control device and a field unit.

FIG. 3 shows a wired communication between a known evaluation unit 54, HART® master 54, or control unit 54, and a sensor 52 or field unit 52 or HART® slave 52. The HART® master 54 is connected to the HART® slave 52 over the field bus 56. E.g., the field bus 56 can be a shielded twisted pair cable according to #18 AWG. AWG is a U.S. standard and means American Wire Gauge. #18 AWG is a cable with a diameter of 1.02 mm. Depending on the cable capacity or the number of connected units, a #18 AWG cable allows to achieve a bus length of the HART® bus 6 of between 700 m and 3000 m.

Figure 4:
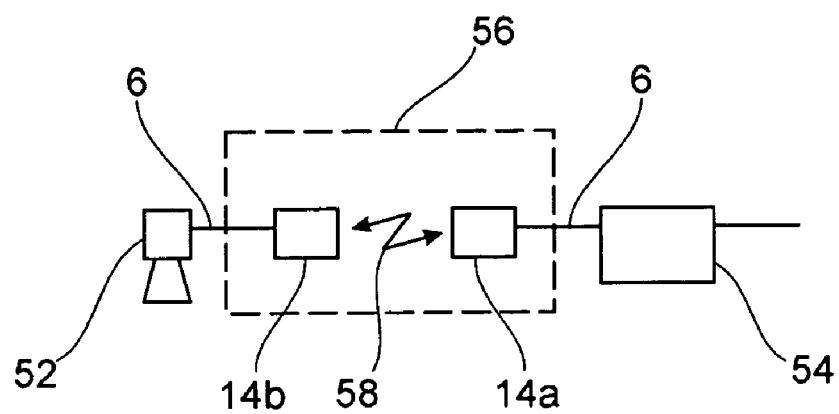
FIG. 4 shows a schematic block diagram of an arrangement for wireless communication between a control device and a field unit by a radio transmission device according to an exemplary embodiment of the present invention.

FIG. 4 shows a schematic block diagram of an arrangement for wireless communication between a control device and a field unit by a radio transmission device according to an exemplary embodiment of the present invention. FIG. 4 shows how by the radio transmission device 56 the HART® bus 6 can be separated between the HART® master 54 and the HART® slave 52 and replaced by a radio connection. The radio transmission device 56 comprises the two identical radio modules 14*a* and 14*b*. The radio module 14*a* is connected through a standard HART® bus 6 to the HART® master 54. It is located at the control unit side of the radio transmission device 56. The radio module 14*b* is solidly connected through a standard HART® bus 6 at the field unit side of the radio transmission device 56 to the HART® slave, for instance a sensor 52.

Between the two radio modules 14*a* and 14*b*, a radio transmission is taking place over the radio link 58. The radio protocol of the radio link 58 is a HART® protocol packetized into a radio telegram. The designation HART® over Air is used for this purpose. The radio protocol HART® over Air enables bidirectional communication of the two radio modules 14*a* and 14*b*. The sensor 52 together with the radio module 14*b* can be mobile, just like the HART® master 54 and the radio module 14*a*. As long as the radio modules 14*a* and 14*b* are within radio range, communication can take place therebetween. The radio range is defined by a sufficient signal strength, at which a transmitted signal can still be received and evaluated.

Figure 5:
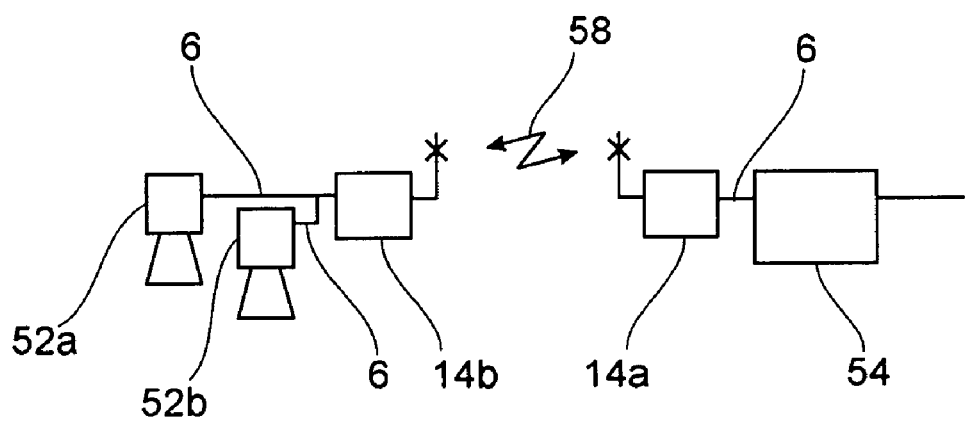
FIG. 5 shows a schematic block diagram for wireless communication between a control unit and two field units according to the present invention.

FIG. 5 shows a wireless communication between one HART® master 54 and two sensors 52*a* and 52*b*. Communication takes place similarly as described in FIG. 4, the radio signal received by the radio module 14*b* is output on the HART® bus 6. However, two sensors 52*a* and 52*b* are connected to the HART® bus 6 of the radio module 14*b*. Both receive the HART® telegram extracted from the radio telegram by the radio module 14*b*.

According to the HART® standard, it is possible to operate several slaves at one HART® bus 6. According to the HART® specification, addressing of the sensors is possible. As the radio transmission by the radio modules 14*a*, 14*b* and the radio link 58 is transparent for the HART® master 54, and the sensors 52*a* and 52*b*, addressing and communication can take place exactly as over the standard HART® bus. Consequently, the corresponding sensor can be requested by the master 54.

Figure 6:
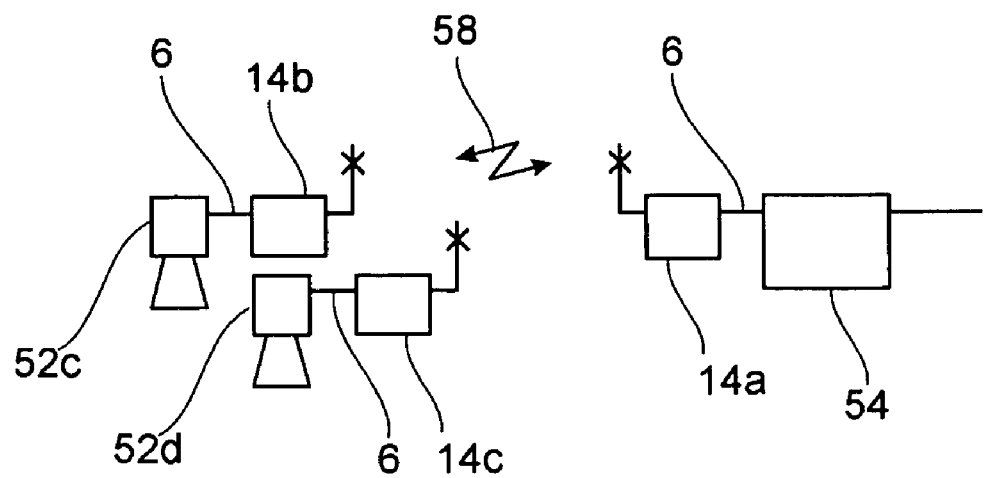
FIG. 6 shows another block diagram for wireless communication between a control device and two field units according to an exemplary embodiment of the present invention.

FIG. 6 shows another possibility for connecting two sensors 52*c*, 52*d* to a HART® master 54 by a wireless communication. The air replaces the function of a physical bus, i.e. a common shared medium. Consequently, all radio modules located within in range of a radio signal between two radio modules can be considered as belonging to the bus.

In FIG. 6, the radio modules 14*a*, 14*b* and 14*c* are within radio range. I.e. they all see a radio signal 58 sent by one of the radio modules. E.g. radio module 14*a* sends a request from master 54 on the radio link 58. The radio telegram is received both by radio module 14*b* and 14*c*. Both radio modules pass the extracted HART® message on the HART®) bus 6 respectively connected thereto on to the respectively connected sensor 52*c* or 52*d*. This alternative connection is comparable with the connection of several sensors to one physical HART® bus. By addressing corresponding to the HART® standard, the desired field unit 52*c*, 52*d* can be selected. Only the correspondingly addressed field unit supplies a response signal to the master 54.

Figure 7:
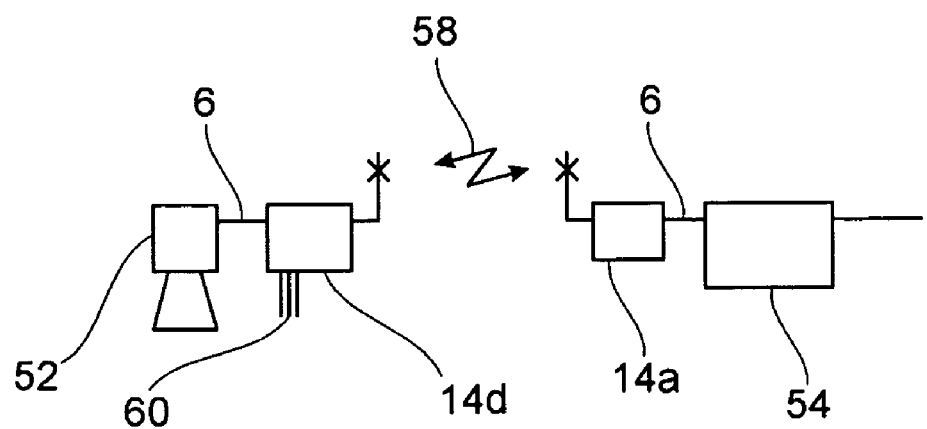
FIG. 7 shows a schematic block diagram for wireless communication between a control device and a field unit and the connection of non HART® units according to the present invention.

FIG. 7 shows a schematic block diagram for wireless communication between a control device and a field unit, and the connection of non HART® units according to the present invention. FIG. 7 shows a wireless communication between HART® master 54 and HART® slave 52. For this purpose, the HART® bus 6 is separated, and replaced by the radio modules 14*a*, 14*d* and the radio link 58. The radio module 14*d* has additional ports 60. These additional ports 60 can serve for the direct connection of analog signals, in particular 4 . . . 20 mA signals or digital or switch signals. Thereby, it is also possible to connect in addition to the HART® port 6 further sensors to the ports 60, which do not operate according to the HART® standard. These ports are provided for instance for 4 . . . 20 mA signals or for simple switches. Due to the transmission of the signals via the air interface, the analog signals still may have to be digitized and made HART® capable.

Figure 8:
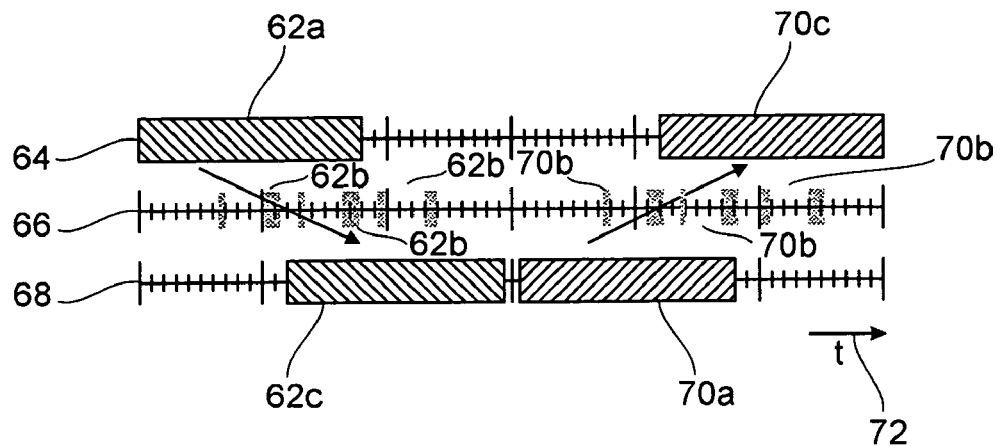
FIG. 8 shows a request-response timing chart according to an exemplary embodiment of the present invention.

FIG. 8 shows a request-response timing chart according to a sample embodiment of this invention. FIG. 8 shows how due to the installation of radio modules additional delays in the timing behavior result for a request 62*a* or a response 70*a* according to the HART® protocol. The timing chart 64 shows the time history of a HART® request packet 62 at the site of a radio module 14 connected to a master. The request packet 62*a* is output by the master on the HART® bus, and reaches the radio module 14 connected to the HART® master. The request packet 62*a* is packetized by the radio module 14 into corresponding telegrams of the radio protocol. E.g. a bigger request 62*a* can be disassembled into smaller radio telegram 62*b* on the radio link. Disassembling or packetizing creates additional latencies. A delay is created thereby.

The timeline 66 shows the HART® request packet packetized into the radio protocol on the radio link 58. The radio packets 62*b* migrate over the air interface to the receiving radio module, by which they are again reconverted into HART® packets.

The timeline 68 shows the HART® request packet 62*c*, which has been reconverted by the receiving radio module from the radio packets 62*b*. The received HART® request packet 62*c* corresponds to the request packet 62*a* emitted by the evaluation unit or the HART® master. Due to the reconversion of the radio packets 62*b* into the request packet 62*c* an additional latency has been created.

In comparison with a request signal propagated on a standard HART® bus, a higher propagation time has been created due to disassembly, packetizing or depacketizing and assembly. The request packet 62*c* reaches the sensor. The request packet 62*c* is evaluated by the sensor, and the sensor answers with a response packet 70*a* according to the HART® specification. The HART® response packet 70*a* has also been represented on the timeline 68. It reaches the radio module connected to the field unit, and is also converted into radio messages 70*b* compatible with radio transmission, and transmitted via the radio interface.

At conversion, latency is further increased. After transmission via the air interface, the radio message 70*b* reaches the master side radio module and is again converted thereby into the corresponding HART® packet 70*c*. The HART® response packets 70*a* and 70*c* are identical. There is only a time difference therebetween, which has occurred due to latencies and signal propagation times.

Due to the additional latencies from packetizing and depacketizing both of the request packets 62*a* and the response packet 70*a*, on the timeline 64 as viewed by the master, a time interval occurs between request signals 62*a* and 70c. According to the HART® specification, a slave's response signal to a master's request must be available within 256 ms. As additional latency results from the double radio link, the evaluation unit cannot expect a response within the time required by the specification. Consequently, the evaluation unit or the HART® master must have a timeout behavior adjusted to the radio technology. E.g., the timer, within which the response signal is supposed to be available, has to be increased and be more than 256 ms.

By the time arrow 72 continuous time is represented in FIG. 8. Herein, the three timelines 64, 66 and 68 show different geographical locations.

Figure 9:
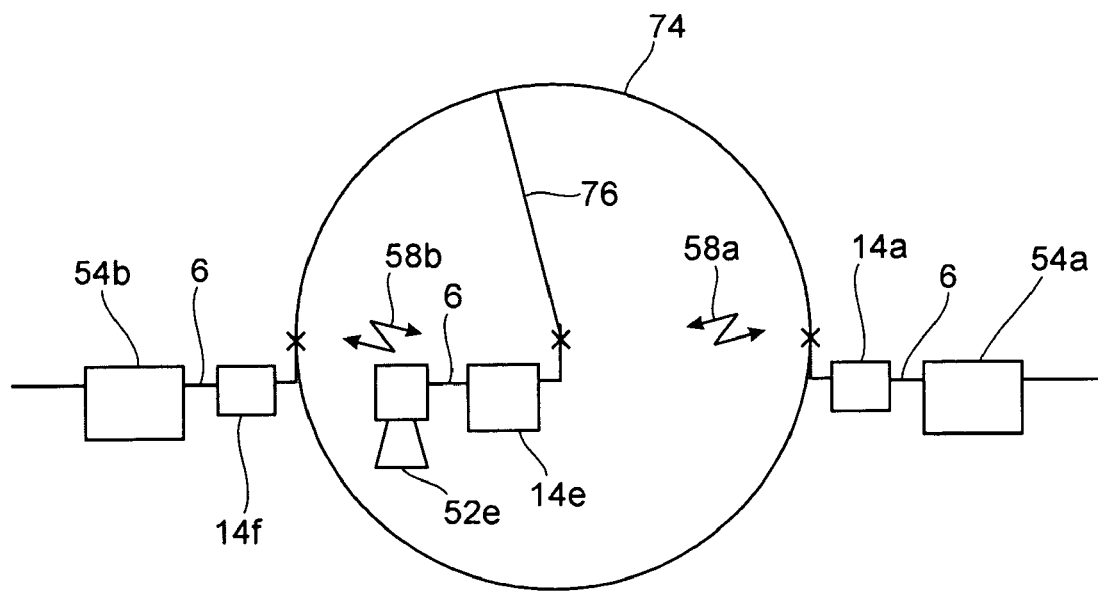
FIG. 9 shows a schematic block diagram of an arrangement for accessing two masters within a radio range of a field unit according to an exemplary embodiment of the present invention.

FIG. 9 shows the operation of two masters 54a and 54b and a slave 52e in connection with the inventive radio modules 14a, 14e and 14f during wireless communication. For simplicity's sake, regarding the description of the radio range, the term of the masters 54a and 54b as well as the slave 52e is to be used with the same meaning as the correspondingly connected radio modules 14a, 14e and 14f.

The HART® specification allows for alternate access of two masters on the HART® bus 6 through rules defining the chronological access of the master 54a, 54b on the bus 6. In response to an own request, a master 54a may make a new request at the earliest after 75 ms. However, in response to an outside request already after 20 ms to 75 ms. This ensures that the two masters 54a, 54b can always function alternately. I.e. access to the bus is regulated by the timing behavior.

When replacing or separating a standard HART® bus by the radio transmission modules 14a, 14e and 14f it may happen that the two masters 54a, 54b or the corresponding radio modules 14a and 14f are not within radio range. This situation is represented in FIG. 9. In addition to other parameters, the radio range is defined by the attenuation behavior of the medium, the frequency, or the transmitting power or sensitivity in the radio modules 14a, 14e, and 14f, and antenna quality or gain. In FIG. 9, let the radio range between two radio modules be defined as the radius of a circle 76. This means that a radio signal, after having traveled the distance 76, can no longer be perceived.

In FIG. 9, the slave 52e together with the radio module 14e is in the center of the circle with the circumference 74. On the circumference 74, there are both radio module 14a with master 54a and radio module 14f with master 54b. The slave 52e with radio module 14e is exactly in the middle between the two masters or their radio modules 14a, 54a and 14f, 54b. The distance of the two masters or their radio modules is thus twice the radio range. In this case, each master or its radio module 14a, 14f is in touch with slave 52e or the radio module 14e thereof.

However, the two masters themselves are outside their radio range. This means that a signal emitted by radio module 14a does not have enough energy to reach the radio module 14f. The two masters or the radio modules 14a and 14f do not see each other. However, they do see response signals emitted by slave 52e or radio module 14e.

In FIG. 10, a corresponding timing behavior is represented. In FIG. 10, six timelines 78, 80, 82, 84, 86, and 88 can be seen. The time arrow 104 indicates the direction of time progression.

The timelines 78, 80, 82, 84, 86, and 88 correspond to the local positions of the components represented in FIG. 9. Timeline 78 corresponds to the timing behavior at master 54a. Timeline 80 corresponds to the timing behavior at radio module 14a. Timeline 82 corresponds to the timing behavior at radio module 14e. Timeline 84 corresponds to the timing behavior at slave 52e. Timeline 86 corresponds to the timing behavior at radio module 14f. Timeline 88 corresponds to the timing behavior at master 54b.

In the constellation represented in FIG. 10, for instance master 54a emits a request or a corresponding request telegram 90a according to the HART® standard on the bus 6. This request packet 90a reaches the radio module 14a over the bus 6. There it is converted into the radio telegram 90b and transmitted over the radio transmission link 58a. Radio module 14e receives the radio telegram 90b thus emitted as radio telegram 90c, converts it into the HART® request telegram 90d and outputs it to slave 52e.

Slave 52e evaluates the received request signal 90d according to the HART® protocol and supplies a corresponding response signal or response message 92a. This HART® message is passed on to the radio module 14e. Radio module 14e converts the response signal 92a into the radio message 92b. Radio module 14e broadcasts the radio message 92b. Due to the omni characteristic used of the antenna, the radio message 92b propagates according to the range, determined by the radius 76, in all directions in the shape of a circle around the radio module 14e.

The radio telegram 92b reaches the radio module 14a as the radio telegram 92c, and by occupying a packetizing or depacketizing time is converted by radio module 14a into the HART® response telegram 92d, and as such provided to the master 54a. Due to the omnidirectional propagation of the radio signal 92b, the signal 92b reaches the radio module 14f as signal telegram 92e. The radio module converts the radio telegram 92e into the HART® response telegram 92f, and retransmits it over the connected HART® bus 6 to the master 54b.

The master 54b recognizes that it is a response signal meant for master 54a. It is therefore an outside response signal as viewed by master 54b. Master 54b receives the response or the response telegram 92f, although the request 90a or the request signal 90b cannot be perceived by itself. The radio module 14f lies outside the radio range of the radio module 14a. Upon receipt of the outside response 92f, master 54b can start an own request according to the HART® protocol in a time range from 20 ms to 75 ms.

The response packet 92d or response signal 92d is for master 54a the response to an own request, in this case to request packet 90a. Upon receipt of the response packet 92d, master 54a has to wait for some time before it can make a new request. This compulsory pause ensures that the common medium, i.e. the bus or the radio transmission medium, can be used with equality by masters 54a and 54b.

The waiting time after receiving an own response is chosen to be greater than the time the response of a request from master 54b would require until the output of this request to master 54a. All packetizing, depacketizing and other latencies or signal propagation times are taken into account therein. This waiting time is more than 75 ms. E.g. the waiting time between receiving a response to an own request and the retransmission of a request 94a is more than 500 ms. With a sufficiently fast radio system, a waiting time of less than 500 ms can be achieved. After waiting for 500 ms, a new request by master 54a can be made. The request packet 94a is dispatched as described before, and leads to the response signal 96d or 96f.

If master 54b has to direct a request to slave 52e, it can make a request within a time period from 20 ms to 75 ms after receiving an outside response signal. In FIG. 10, master 54b receives the outside response signal 98f. This is the response signal of the slave 52e to a request of the master 54a. Within a time period from 20 to 75 ms the master 54b can direct its request signal 100a corresponding to the HART® protocol to the slave 52b.

The HART® packet 100a is provided over the HART® bus 6 to the radio module 14f for transmission. Radio module 14f packetizes the request message 100a, and sends the radio packet 100b. As radio packet 100d, this is received by radio module 14e, depacketized, and provided to the slave 52e as HART® request packet 100c.

The slave 52e evaluates the request 100c, and generates a response packet 102a. Via the radio module 14e, the response packet 102a is packetized into the radio packet 102d, and due to the omni characteristic of the antenna of the radio module 14e dispatched in all directions. As radio packet 102b it reaches the radio module 14f, which generates the HART® response packet 102c from the radio packet 102b.

Over the HART® bus 6 the radio module 14f provides the master 54b with the response packet 102c. The response packet 102c is the response to the own request 100a of the master 54b. As response packet 102f the response for master 54b also reaches the master 54a. However, the latter recognizes the response packet 102f as the response to an outside request.

Due to special timing in the evaluation unit 54 or HART® master 54 the wireless communication with HART® units or field units or HART® slaves 52 operating according to the existing HART® specification is enabled.

Additionally, it is to be noted that "comprising" does not exclude any other items or steps, and "one" does not exclude a plurality. Furthermore, it is to be noted that characteristics or steps, which have been described with reference to one of the sample embodiments above, can also be used in combination with other characteristics or steps of other sample embodiments described above. Reference numerals in the claims are not to be construed as a limitation.

The invention claimed is:

1. Data transmission system for wireless communication, the data transmission system comprising:
    a control device;
    a field unit;
    a radio transmission device;
    wherein the control device is adapted to communicate with the radio transmission device via a field bus protocol;
    wherein the field unit is adapted to communicate with the radio transmission device via the field bus protocol;
    wherein the radio transmission device is adapted to transmit the field bus protocol by a radio protocol,
    wherein the control device adapts a timeout behavior of the field bus protocol to a radio signal transmission, and
    wherein the field bus protocol is a protocol selected from the group of the field bus protocols consisting of HART®, Profibus and Fieldbus Foundation.

2. Data transmission system according to claim 1, wherein the timeout behavior of the HART® protocol in the control device is adapted to the radio signal transmission.

3. Data transmission system according to claim 1, wherein the radio protocol is a protocol, selected from the group of the radio protocols the group consisting of WLAN, Bluetooth and Zigbee.

4. Data transmission system according to claim 1, wherein the radio transmission device is adapted to transmit an analog signal to the control device.

5. Data transmission system according to claim 4, wherein the analog signal is a 4 . . . 20 mA signal.

6. Data transmission system according to claim 1, wherein the radio transmission device is adapted to transmit a switch signal to the control device.

7. Data transmission system according to claim 1, the radio transmission device further comprising: a memory device; wherein the memory device is adapted to store information provided by the field unit; and wherein the memory device is adapted to provide on demand the control device with the stored information.

8. Data transmission system according to claim 1, wherein the control device is adapted as a HART® master.

9. Data transmission system according to claim 1, wherein the field unit is adapted as a HART® slave.

10. Data transmission system according to claim 1, wherein the field unit is adapted as a sensor selected from the group consisting of a filling level sensor, a pressure sensor and a limit sensor.

11. Data transmission system according to claim 1, wherein the control device is adapted to make a new request after receiving an own response at the earliest after 75 ms.

12. Data transmission system according to claim 1, wherein the control device is adapted to make a new request upon receipt of an outside response within a range from 20 ms to 75 ms.

13. Control device for wireless communication with a field unit, the control device comprising:
    a field bus conversion device;
    a timeout adaptation device;
    wherein the field bus conversion device is adapted to convert a control signal into a field bus signal according to a field bus protocol;
    wherein the timeout adaptation device adapts a timing behavior of the field bus protocol to a radio signal transmission, and
    wherein the field bus protocol is a protocol selected from the group of the field bus protocols consisting of HART®, Profibus and Fieldbus Foundation.

14. Control device according to claim 13, wherein the field bus conversion device is adapted to provide a field bus signal according to a specification selected from the group of specifications the group consisting of HART®, Profibus and Fieldbus Foundation.

15. Control device according to claim 14, wherein the control device is adapted as a HART® master.

16. Control device according to claim 13, wherein the control device is adapted to make a new request after receiving an own response at the earliest after 75 ms.

17. Control device according to claim 13, wherein the control device is adapted to make a new request upon receipt of an outside response within a range from 20 ms to 75 ms.

18. Transmitting-receiving device, comprising:
    a transmitting device;
    a receiving device; and
    a memory device
    wherein the transmitting device is adapted to convert a field bus protocol into a radio protocol, and to send it;
    wherein the receiving device is adapted to convert the radio protocol into the field bus protocol, and to receive it,
    wherein the memory device is configured to store field bus protocol information,
    wherein the memory device is configured to provide the stored information on demand in order to answer a request from a control device having a timeout adaptation device for adapting a timing behavior of the field bus protocol to a radio transmission, and
    wherein the field bus protocol is a protocol selected from the group of field bus protocols, the group consisting of HART®, Profibus and Fieldbus Foundation.

19. Transmitting-receiving device according to claim 18, wherein the radio protocol is a protocol selected from the group of radio protocols the group consisting of WLAN, Bluetooth, and Zigbee.

20. Transmitting-receiving device according to claim 18, wherein the transmitting-receiving device is adapted to transmit an analog signal.

21. Transmitting-receiving device according to claim 20, wherein the analog signal is a 4 . . . 20 mA signal.

22. Transmitting-receiving device according to claim 18, wherein the transmitting-receiving device is adapted to transmit a switch signal.

23. Method for wireless communication in a data transmission system, the data transmission system comprising:
 a control device;
 a field unit;
 a radio transmission device;
 wherein the method comprises:
  adapting a timeout behavior of a field bus protocol to a radio signal transmission;
  communicating of the control device with the radio transmission device by the field bus protocol;
  transmitting the field bus protocol by a radio protocol;
  communicating of the radio transmission device with the field unit by the field bus protocol, and
 wherein the field bus protocol is a protocol selected from the group of the field bus protocols consisting of HART®, Profibus and Fieldbus Foundation.

24. Method according to claim 23, further comprising: waiting of the control device before dispatching a new request upon receipt of a response to a self-request for at least 75 ms.

25. Method according to claim 23, further comprising: dispatching a new request of the control device upon receipt of an outside response within a range from 20 ms to 75 ms.

26. Method for wireless communication with a control device, the control device comprising:
 a field bus conversion device;
 a timeout adaptation device;
 wherein the method comprises:
  converting a control signal into a field bus signal according to a field bus protocol by the field bus conversion device; and
  adapting a timing behavior of the field bus protocol to a radio signal transmission by the timeout adaptation device, and
 wherein the field bus protocol is a protocol selected from the group of the field bus protocols consisting of HART®, Profibus and Fieldbus Foundation.

27. Method according to claim 26, further comprising: adapting the timing behavior of the field bus conversion device to a radio signal transmission.

28. Method according to claim 26, further comprising: waiting of the control device before dispatching a new request upon receipt of a response to a self-request for at least 75 ms.

29. Method according to claim 26, further comprising: dispatching a new request of the control device to an outside request within a range from 20 ms. to 75 ms.

* * * * *